United States Patent [19]

Kurakake

[11] 4,322,794
[45] Mar. 30, 1982

[54] BUS CONNECTION SYSTEM

[75] Inventor: Mitsuo Kurakake, Kokubunji, Japan

[73] Assignee: Fujitsu Fanuc Ltd., Tokyo, Japan

[21] Appl. No.: 109,539

[22] Filed: Jan. 4, 1980

[30] Foreign Application Priority Data

Jan. 17, 1979 [JP] Japan .................................. 54-4408

[51] Int. Cl.³ .............................................. G06F 1/00
[52] U.S. Cl. .................................................. 364/200
[58] Field of Search ....................... 364/200 M.S. File

[56] References Cited

U.S. PATENT DOCUMENTS

| | | | |
|---|---|---|---|
| 3,638,195 | 1/1972 | Brender et al. | 364/200 |
| 3,858,182 | 12/1974 | Delagi et al. | 364/200 |
| 4,057,849 | 11/1977 | Ying et al. | 364/200 |

Primary Examiner—Raulfe B. Zache
Attorney, Agent, or Firm—Staas & Halsey

[57] ABSTRACT

A bus connection system in which data transmission and reception between a central processing unit and a memory, an input/output control circuit or like peripheral circuit is performed via a bus. A plurality of buses are each connected to the central processing unit via a driver and a receiver, and the driver and the receiver are controlled by the central processing unit.

6 Claims, 7 Drawing Figures

FIG. 3
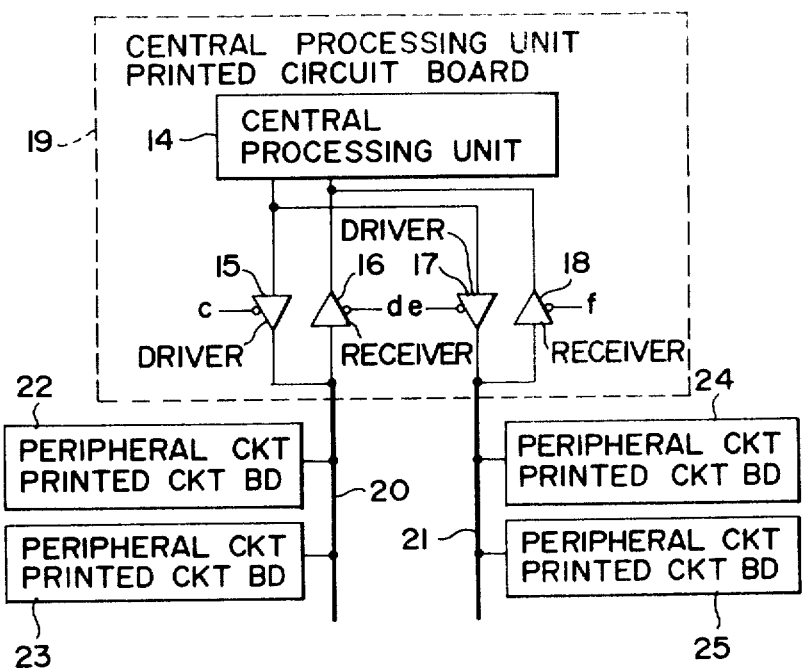
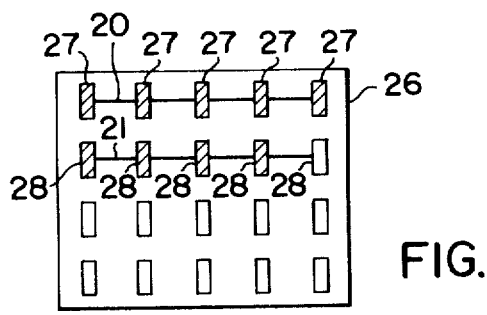
FIG. 4A
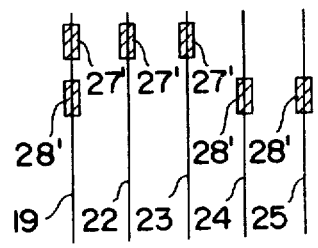
FIG. 4B

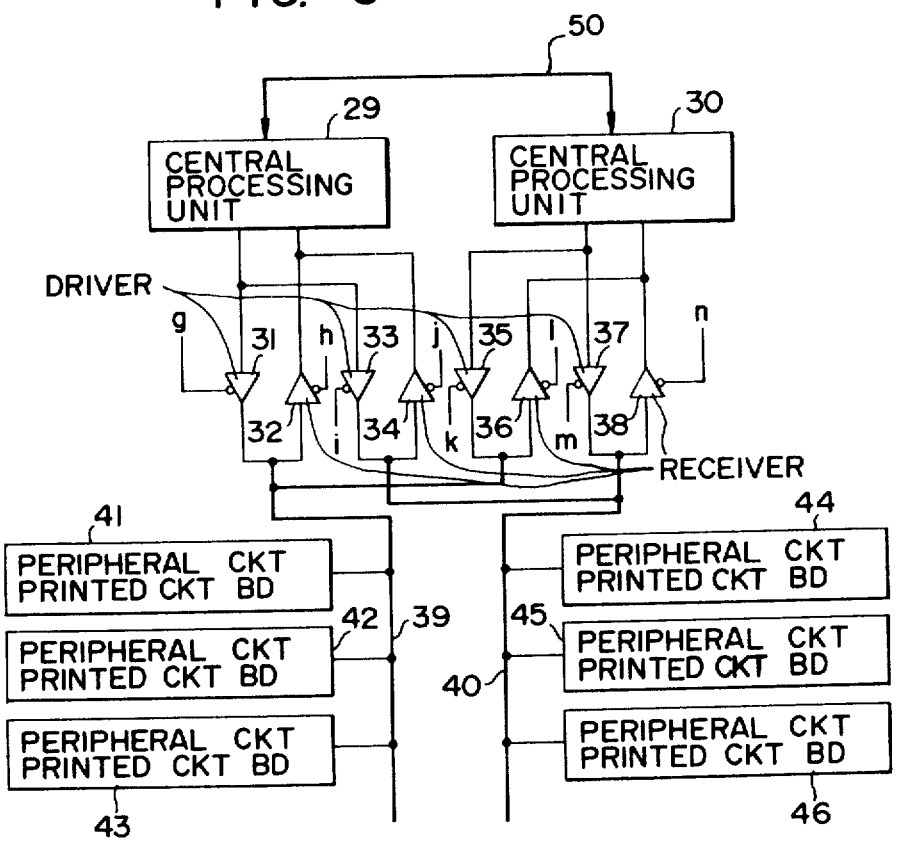

BUS CONNECTION SYSTEM

BACKGROUND OF THE INVENTION

1. Field of the Invention

This invention relates to a bus connection system for a data transmission and reception between a central processing unit and a memory, an input/output control circuit or like peripheral circuit are performed via a bus.

2. Description of the Prior Art

A data processor unit of the type that a central processing unit printed circuit board and peripheral circuit printed boards carrying a memory, an input/output control circuit and so forth are connected by means of a back panel usually has such an arrangement as shown in FIG. 1, for example. FIG. 1 indicates a central processing unit 1, a driver 2, a receiver 3, a central processing unit printed circuit board 4, peripheral circuit printed circuit board 6 to 9, and a bus 5 of a back panel. A control signal a for the driver 2 and a control signal b for the receiver 3 are provided from the central processing unit 1 when the central processing unit 1 transmits or receives data.

The printed circuit boards 4 and 6 to 9 are interconnected via the bus 5 by inserting their connecting portions 11', 12' and 13' into connectors 11 and power source connectors 12 and 13 which are connected with the bus 5 of the back panel 10, as shown in FIGS. 2A and 2B.

With such a conventional arrangement, however, the number of peripheral circuit printed circuit boards which can be connected to the bus 5 is limited by the number of fan-outs of the driver 2 loaded on the central processing unit printed circuit board 4, an increase in delay of signal transmission caused by an increase in the bus length and the throughput of the central processing unit 1.

SUMMARY OF THE INVENTION

Accordingly, it is an object of this invention to provide a bus connection system for a data processor unit which permits connection of a plurality of buses to one central processing unit so as to increase the number of peripheral circuit printed circuit boards connectable with the central processing unit.

Briefly stated, according to the bus connection system of the present invention, in a data processor unit in which data transmission and reception between a central processing unit and a peripheral circuit are effected via a bus, the central processing unit and a plurality of buses are respectively interconnected via drivers and receivers which are controlled by the central processing unit.

BRIEF DESCRIPTION OF THE DRAWINGS

FIG. 3 is a block diagram illustrating an embodiment of this invention;

FIGS. 4A and 4B are schematic diagrams showing the relationships between a back panel and printed circuit boards utilized in the embodiment of FIG. 3; and FIG. 5 is a block diagram illustrating another embodiment of this invention.

DESCRIPTION OF THE PREFERRED EMBODIMENTS

Figure 1:
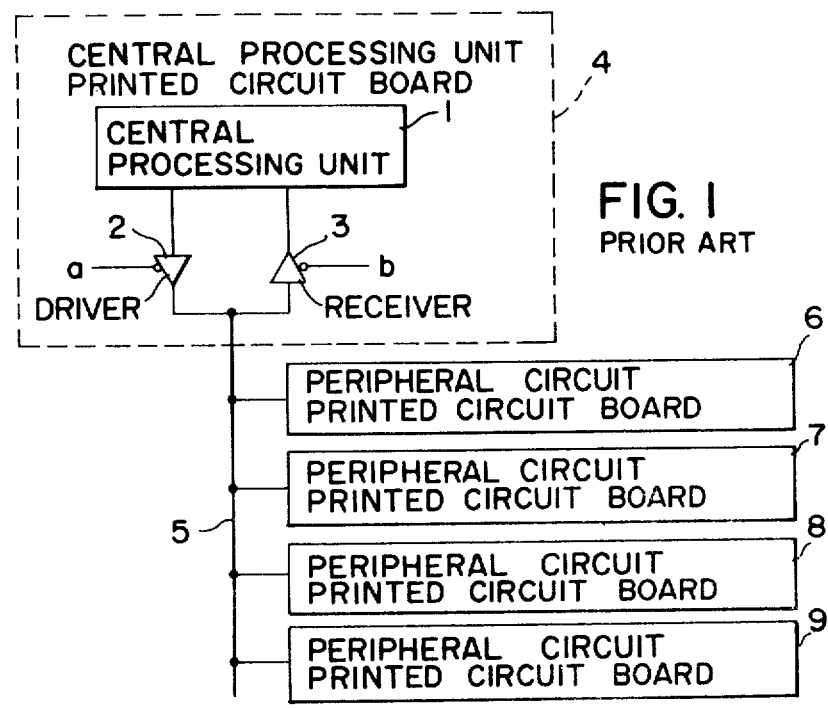
FIG. 1 is a block diagram showing the connection of a conventional data processor unit.
Figure 2A:
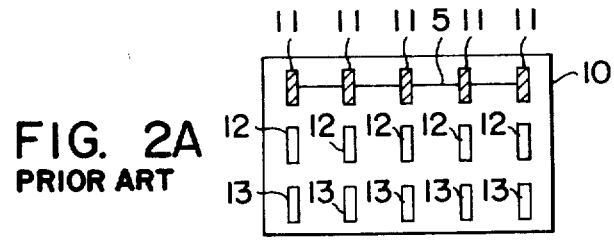
FIGS. 2A and 2B are schematic diagrams explanatory of the relationships between a back panel and printed circuit boards used in the conventional data processor unit of FIG. 1.
Figure 2B:
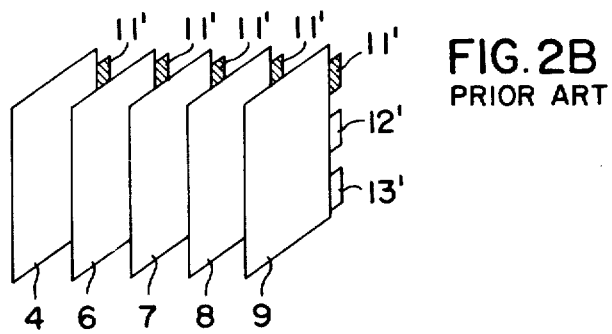

In FIG. 3 there is illustrated in block form an embodiment of this invention, in which two buses are connected to one central processing unit. In FIG. 3, two drivers 15 and 17 and two receivers 16 and 18 are provided for one central processing unit 14 loaded on a central processing unit printed circuit board 19. The driver 15 and the receiver 16 are connected to a bus 20, and the driver 17 and the receiver 18 are connected to a bus 21. To the buses 20 and 21 are connected peripheral circuit printed circuit boards 22 to 25 equipped with memories, input/output control circuits and so forth. The drivers 15 and 17 and the receivers 16 and 18 are controlled by control signals c to f which are provided from the central processing unit 14.

FIGS. 4A and 4B schematically show the relationships between a back panel 26 and the printed circuit boards 19 and 22 to 25. To the buses 20 and 21 of the back panel 26 are respectively connected connectors 27 and 28; the central processing unit printed circuit board 19 is connected via their connecting portions 27' and 28' to the buses 20 and 21; the peripheral circuit printed circuit boards 22 and 23 are connected via their connecting portions 27' to the bus 20; and the peripheral circuit printed circuit boards 24 and 25 are connected via their connecting portions 28' to the bus 21.

As described above, the two buses 20 and 21 are connected to one central processing unit 14 and the peripheral circuit printed circuit boards 22 to 25 can be connected to either of the buses 20 and 21; therefore, it is possible to connect to the central processing unit the peripheral circuit printed circuit boards twice as many as those in the prior art in which only one bus is connected to the central processing unit.

FIG. 5 illustrates in block form another embodiment of this invention, in which two central processing units are employed to provide for increased throughput of the data processor unit. In FIG. 5, central processing units 29 and 30 are connected to a computer bus 50, and the one central processing unit 29 is connected to a bus 39 via a driver 31 and a receiver 32 and to a bus 40 via a driver 33 and a receiver 34, whereas the other central processing unit 30 is connected to a bus 39 via a driver 35 and a receiver 36 and to a bus 40 via a driver 37 and a receiver 38. To the buses 39 and 40 are respectively connected peripheral circuit printed circuit boards 41 to 46 to achieve data transmission and reception between them and the central processing units 29 and 30. Control signals g to j are applied from the central processing unit 29 to the drivers 31 and 33 and the receivers 32 and 34, and control signals k to n are applied from the central processing unit 30 to the drivers 35 and 37 and the receivers 36 and 38. Consequently, the central processing units 29 and 30 are capable of sharing the buses 39 and 40. If the driver 35 and the receiver 36 are left out, then only the one central processing unit 29 is connected to the buses 39 and 40 and the other central processing unit 30 is connected to the one bus 40. The central processing unit printed circuit board may be formed to carry the two central processing units 29 and 30, the drivers 31, 33, 35 and 37 and the receivers 32, 34, 36 and 38; but this printed circuit board may also be divided into two, one having loaded thereon the central processing unit 29, the drivers 31 and 33 and the receivers 32 and 34, and the other the central processing unit 30, the drivers 35 and 37 and the receivers 36 and 38.

As has been described in the foregoing, according to the present invention, a plurality of buses are connected to a central processing unit via pluralities of drivers and receivers which are controlled in operation by control signals from the central processing unit. Since peripheral circuit printed circuit boards of the same number as those in the prior art can be connected to each of the buses, it is possible to increase the number of peripheral circuit printed circuit boards that can be connected to one central processing unit.

Accordingly, it is easy to construct a large capacity, external memory using a number of inexpensive printed circuit boards carrying small capacity memories; this leads to the advantage that the function of a data processor unit can be enlarged economically.

It will be apparent that many modifications and variations may be effected without departing from the scope of the novel concepts of this invention.

What is claimed is:

1. A bus connection system for a data processor unit which effects data transmission and reception between a central processing unit and first and second pluralities of peripheral circuits, comprising:
    a first bus connected to each of the peripheral circuits comprising the first plurality of peripheral circuits;
    a first driver and a first receiver for selectively connecting the central processing unit to said first bus;
    a second bus connected to each of the peripheral circuits comprising the second plurality of peripheral circuits;
    a second driver and a second receiver connected to the central processing unit and to said second bus, the central processing unit providing control signals for controlling the operation of the first and second drivers and the first and second receivers.

2. The system as set forth in claim 1, wherein the central processing unit, said first and second drivers and said first and second receivers are located on a single printed circuit board.

3. A bus connection system for a data processor unit, having first and second interconnected central processing units, which effects data transmission and reception to and from first and second pluralities of peripheral circuits, comprising:
    first and second drivers and first and second receivers connected to the first central processing unit;
    third and fourth drivers and third and fourth receivers connected to the second central processing unit;
    a first bus coupled to said first and third drivers and said first and third receivers and coupled to the first plurality of peripheral circuits;
    a second bus coupled to said second and fourth drivers and said second and fourth receivers, and coupled to the second plurality of peripheral circuits, said first and second buses being operatively connectable to one or both of the first and second central processing units in dependence upon the load on each of the first and second central processing units.

4. The system as set forth in claim 1, 2 or 3, wherein at least one of said first and second pluralities of peripheral circuits comprises an input/output control circuit.

5. The system as set forth in claim 4, wherein at least one of the peripheral circuits of said first and second pluralities of peripheral circuits comprises an external memory.

6. The system as set forth in claim 5, wherein the external memory comprises a plurality of printed circuit boards carrying memories.

* * * * *

UNITED STATES PATENT AND TRADEMARK OFFICE
CERTIFICATE OF CORRECTION

PATENT NO. : 4,322,794

DATED : March 30, 1982

INVENTOR(S) : MITSUO KURAKAKE

It is certified that error appears in the above—identified patent and that said Letters Patent is hereby corrected as shown below:

Column 1, line 20, "board" should be --boards--;

line 35, after "4," insert --and by--.

Signed and Sealed this

First Day of June 1982

[SEAL]

Attest:

GERALD J. MOSSINGHOFF

Attesting Officer

Commissioner of Patents and Trademarks